United States Patent
Blitzstein

(10) Patent No.: US 10,037,713 B2
(45) Date of Patent: *Jul. 31, 2018

(54) SYSTEM AND METHOD FOR PROVIDING ADDITIONAL CONTENT ON A WEBPAGE

(71) Applicant: eBay Inc., San Jose, CA (US)

(72) Inventor: Jared Blitzstein, Limerick, PA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/367,140

(22) Filed: Dec. 1, 2016

(65) Prior Publication Data

US 2017/0084202 A1    Mar. 23, 2017

Related U.S. Application Data

(63) Continuation of application No. 14/053,363, filed on Oct. 14, 2013, now Pat. No. 9,514,238.

(51) Int. Cl.
*G06F 17/22* (2006.01)
*G09B 21/00* (2006.01)
*G06F 17/30* (2006.01)

(52) U.S. Cl.
CPC ....... *G09B 21/006* (2013.01); *G06F 17/2247* (2013.01); *G06F 17/3089* (2013.01); *G06F 17/30887* (2013.01); *G06F 17/30905* (2013.01)

(58) Field of Classification Search
CPC ........... G06F 17/3089; G06F 17/30893; G06F 17/30905; G06F 3/04892; G06F 17/2247; G06F 17/30887; G09B 21/006; H04L 67/02

See application file for complete search history.

(56) References Cited

U.S. PATENT DOCUMENTS

| | | | |
|---|---|---|---|
| 7,908,557 B2 * | 3/2011 | Schrepp | G06F 9/4443 715/727 |
| 8,103,956 B2 | 1/2012 | Trujillo | |
| 8,434,135 B2 | 4/2013 | Hilerio et al. | |

(Continued)

OTHER PUBLICATIONS

"U.S. Appl. No. 14/053,363, Final Office Action dated Jan. 29, 2016", 16 pgs.

(Continued)

*Primary Examiner* — Maikhanh Nguyen
(74) *Attorney, Agent, or Firm* — Schwegman Lundberg & Woessner, P.A.

(57) ABSTRACT

In various example embodiments, a system and method for providing additional content on a webpage are provided. In example embodiments, a server receives a trigger for a rule generation process. In response to the receiving of the trigger, the server initiates the rule generation process. The server receives a selection of an element on a webpage to which additional content is to be added without revising source code for the webpage. A user interface panel is displayed through which inputs to configure a content rule for the element and to configure the additional content to be added to the element are received. The server receives the inputs via the user interface panel, and generates, based on the inputs, a rule set that includes the content rule and the additional content. The rule set is stored to a rules database.

17 Claims, 10 Drawing Sheets

(56) References Cited

U.S. PATENT DOCUMENTS

| | | | |
|---|---|---|---|
| 8,572,065 B2* | 10/2013 | McDonald | G06N 5/025 707/708 |
| 8,645,848 B2* | 2/2014 | Lesh | G06F 9/4443 715/760 |
| 8,793,650 B2 | 7/2014 | Hilerio et al. | |
| 8,799,763 B1 | 8/2014 | Singh et al. | |
| 8,862,985 B2* | 10/2014 | Gallo | G09B 21/008 715/234 |
| 9,514,238 B2 | 12/2016 | Blitzstein et al. | |
| 2002/0023059 A1 | 2/2002 | Bari et al. | |
| 2003/0051031 A1 | 3/2003 | Streble | |
| 2006/0090138 A1* | 4/2006 | Wang | G06F 3/0489 715/760 |
| 2006/0150110 A1* | 7/2006 | Dietl | G06F 17/30899 715/760 |
| 2006/0288283 A1* | 12/2006 | Schrepp | G06F 9/4443 715/700 |
| 2008/0148383 A1 | 6/2008 | Pitchaikani et al. | |
| 2008/0184362 A1 | 7/2008 | Kumhyr et al. | |
| 2009/0024936 A1* | 1/2009 | Ragan | G06F 17/3089 715/760 |
| 2009/0083726 A1 | 3/2009 | Amend et al. | |
| 2009/0125469 A1* | 5/2009 | McDonald | G06F 17/30864 706/47 |
| 2010/0070872 A1 | 3/2010 | Trujillo et al. | |
| 2010/0218253 A1 | 8/2010 | Sutton et al. | |
| 2010/0306642 A1 | 12/2010 | Lowet et al. | |
| 2011/0161792 A1 | 6/2011 | Florence et al. | |
| 2011/0161797 A1* | 6/2011 | Dewar | G06F 17/30896 715/234 |
| 2011/0307880 A1 | 12/2011 | Hilerio et al. | |
| 2011/0307946 A1 | 12/2011 | Hilerio et al. | |
| 2013/0332815 A1* | 12/2013 | Gallo | G06F 17/2247 715/234 |
| 2015/0020178 A1 | 1/2015 | Grunin et al. | |
| 2015/0106686 A1 | 4/2015 | Blitzstein | |
| 2015/0234798 A1* | 8/2015 | Mocanu | G06F 17/2247 715/236 |

OTHER PUBLICATIONS

"U.S. Appl. No. 14/053,363, Non Final Office Action dated Jul. 20, 2015", 19 pgs.

"U.S. Appl. No. 14/053,363, Notice of Allowance dated Aug. 4, 2016", 17 pgs.

"U.S. Appl. No. 14/053,363, Response filed Apr. 28, 2016 to Final Office Action dated Jan. 29, 2016", 12 pgs.

"U.S. Appl. No. 14/053,363, Response filed Oct. 20, 2015 to Non Final Office Action dated Jul. 20, 2015", 12 pgs.

* cited by examiner

Get Started with eSite https://scg.esite.com/ws/esite/ISAPI.dll?RegisterEnterInfor&ru=http%3A%2F%2Fwww.esite.com%2F ☐ Most Visited ▼   ☐ Getting Started   ☐ Get Started with eSite

Get started with eSite

Create your personal account or start a business account

Already have an account?

Sign in

First Name

Last Name

Email eSite user ID

Password

Confirm Password

By clicking "Submit" I agree that:
...I have read and accepted the User Agreement and Privacy Policy

FIG. 4B

Get Started with eSite https://scg.esite.com/ws/esite/iSAPI.dl?RegisterEnterInfor&ru=http%3A%2F%2Fwww.esite.com%2F ☐ Most Visited ▼  ☐ Getting Started  ☐ Get Started with eSite

Get started with eSite

Create your personal account or start a business account.

First Name                    Last Name

Email eSite user ID    420

- Use at least 6 characters (letters, numbers, periods, underscores, dashes only).
- To protect your privacy, do not use your email address or full name for your user ID.

422

Password

Confirm Password

By clicking "Submit" I agree that:
I have read and accepted the User Agreement and Privacy Policy Already have an account?

Sign in

Get Started with eSite https://scg.esite.com/ws/esite/ISAPI.dll?RegisterEnterInfor&ru=http%3A%2F%2Fwww.esite.com%2F ☐ Most Visited ▼   ☐ Getting Started   ☐ Get Started with eSite

Get started with eSite

Create your personal account or start a business account.

First Name     Last Name

Email eSite user ID

Password    430

- Use at least 6 upper and lower case letters (A-Z, a-z).
- Include numbers (0-9) or symbols if you want to make it more secure.
- Don't use your user ID or email, and avoid passwords used for other sites.

432

Confirm Password

By clicking "Submit" I agree that:
- I have read and accepted the User Agreement and Privacy Policy Already have an account?

Sign in

SYSTEM AND METHOD FOR PROVIDING ADDITIONAL CONTENT ON A WEBPAGE

PRIORITY

This application is a continuation of and claims the benefit of priority to U.S. patent application Ser. No. 14/053,363 filed on Oct. 14, 2013, which is hereby incorporated by reference herein in its entirety.

FIELD

The present disclosure relates generally to webpages and, in a specific example embodiment, to providing additional content on a webpage without having to change source code for the webpage.

BACKGROUND

Conventionally, when additional content, such accessibility content, is desired to be added to a webpage, source code for the webpage needs to be changed and a new release of the webpage provided. As such, adding additional content to large legacy systems may be complex and require a large amount of manpower. Furthermore, conventional accessibility content (e.g., for users with visual disabilities) often does not provide specifics about what is required or valid. Screen readers, for example, may simply access source code, parse the source code, and provide the parsed content on the webpage.

BRIEF DESCRIPTION OF DRAWINGS

Various ones of the appended drawings merely illustrate example embodiments of the present invention and cannot be considered as limiting its scope.

FIG. 4A is an example screenshot of a webpage.

FIG. 4B is an example screenshot of the webpage illustrating additional content.

FIG. 4C is an example screenshot of the webpage illustrating additional content.

FIG. 4D is an example screenshot of the webpage illustrating additional content.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for providing additional content on a webpage. In example embodiments, an indication of a webpage load at a client device is received. The indication may include an identifier for the webpage (e.g., a URL of the webpage) and potentially a client identifier or other unique identifier used for segmentation. A determination is made that a rule set in a rules database corresponds to the identifier for the webpage (e.g., a match to the URL is found). The rule set, which indicates additional content to be injected into the webpage, is provided. In one embodiment, the rule set may be loaded into memory. The additional content is caused to be injected into the webpage.

Figure 1:
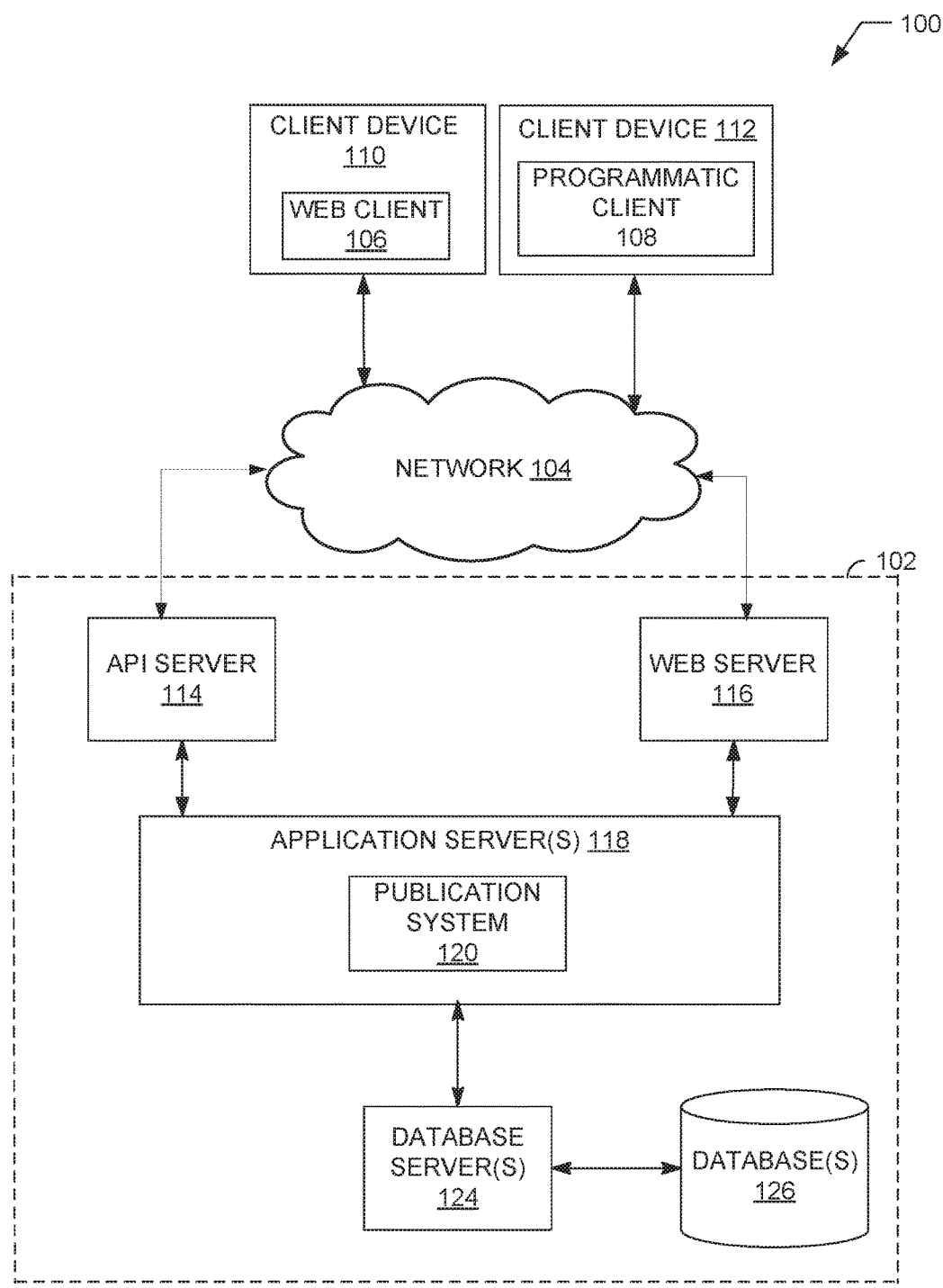
FIG. 1 is a block diagram illustrating an example embodiment of a network architecture of a system used to provide additional content on a webpage.

With reference to FIG. 1, an example embodiment of a high-level client-server-based network architecture 100 enables provisioning of additional content into a webpage. In example embodiments, the additional content is added to the webpage without having to revise the source code for the webpage. A networked system 102, in an example form of a network-server-side functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., such as the INTERNET EXPLORER® browser developed by Microsoft® Corporation of Redmond, Wash. State), and a programmatic client 108 executing on respective client devices 110 and 112.

The client devices 110 and 112 may comprise a mobile phone, desktop computer, laptop, or any other JavaScript supporting communication device that a user may utilize to access the networked system 102. In some embodiments, the client device 110 may comprise a display module (not shown) to display information (e.g., in the form of user interfaces). In further embodiments, the client device 110 may comprise one or more of a touch screen, accelerometer, camera, microphone, and GPS device. The client devices 110 and 112 may be a device of a user, which is used to access content and web pages from the networked system 102. In one embodiment, the networked system 102 is a network-based marketplace that manages digital goods, publishes publications comprising item listings of products available on the network-based marketplace, and manages payments for these marketplace transactions.

An Application Program Interface (API) server 114 and a web server 116 are coupled to, and provide programmatic and web interfaces respectively to, one or more application servers 118. The application servers 118 host a publication system 120 that may comprise one or more modules, applications, or engines, and may be embodied as hardware, software, firmware, or any combination thereof. The application servers 118 are, in turn, coupled to one or more database servers 124 facilitating access to one or more information storage repositories or database(s) 126. In one embodiment, the databases 126 are storage devices that store digital content for presentation on the webpages (e.g., publications or listings) provided by the publication system 120.

In example embodiments, the publication system 120 publishes content (e.g., webpages) on a network (e.g., Internet). As such, the publication system 120 provides a number of publication functions and services to users that access the networked system 102. The publication system 120 is discussed in more detail in connection with FIG. 2. In example embodiments, the publication system 120 may be an online marketplace environment or associated with a non-marketplace environment such as an informational (e.g., search engine) or social networking environment.

While the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system.

Although the various components of the publication system 120 have been defined in terms of a variety of individual modules and engines, a skilled artisan will recognize that many of the items can be combined or organized in other ways and that not all modules or engines need to be present or implemented in accordance with example embodiments. Furthermore, not all components of the publication system 120 have been included in FIG. 2. In general, components, protocols, structures, and techniques not directly related to functions of exemplary embodiments have not been shown or discussed in detail. The description given herein simply provides a variety of exemplary embodiments to aid the reader in an understanding of the systems and methods used herein.

Figure 2:
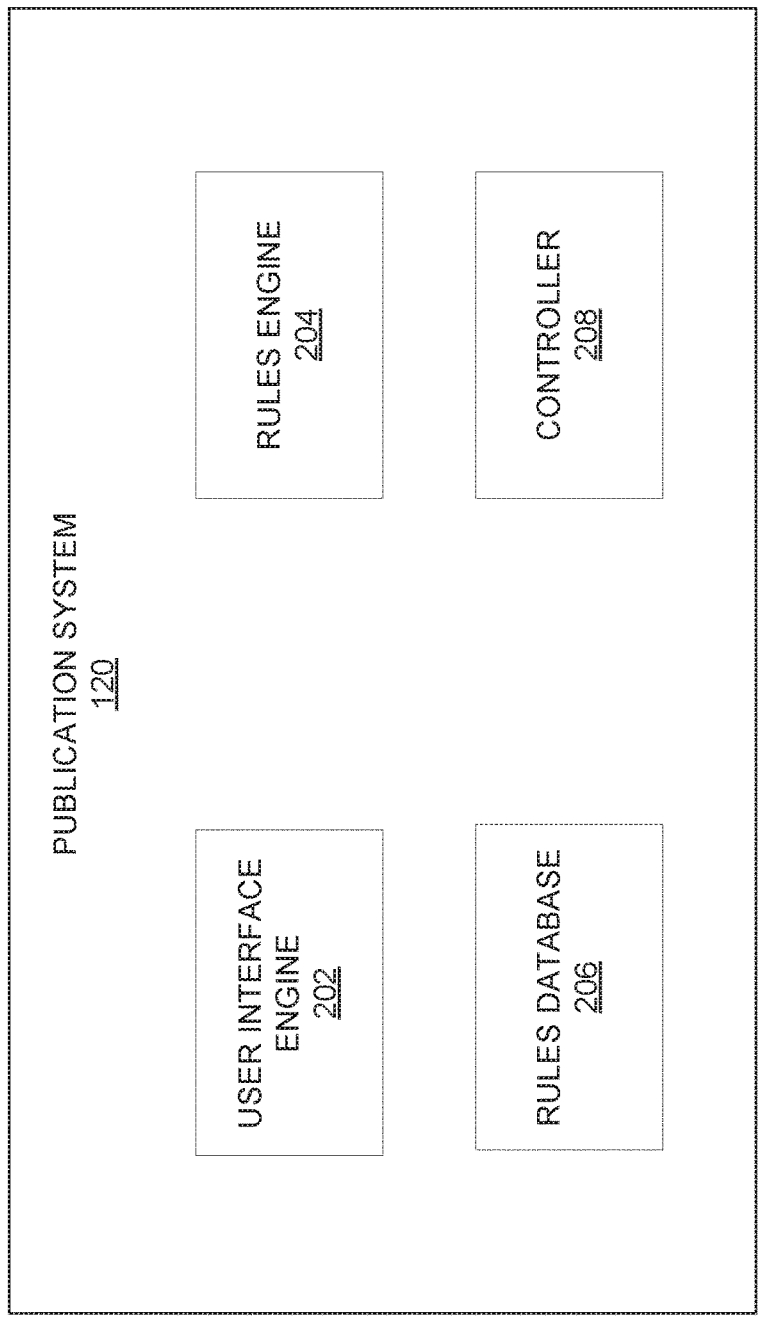
FIG. 2 is a block diagram illustrating an example embodiment of a publication system.

Referring now to FIG. 2, an example block diagram illustrating multiple components that, in one embodiment, are provided within the publication system 120 of the networked system 102 is shown. The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access the one or more databases 126 via the one or more database servers 124. For simplicity, the following discussion is provided with respect to providing accessibility content (e.g., for visually disabled users) on a webpage. However, any type of additional content may be provided using example embodiments (e.g., new image, new text). Additionally, while example embodiments discuss adding content to the webpage, alternative embodiments may remove or hide content from the webpage (e.g., if an offer is not valid for the user, hide the offer) or replace existing content with different content (e.g., provide a product of the day or customized content based on user preferences or profile). As such, the term "additional content" may include content that cause content on the webpage to be hidden or be replaced.

The publication system 120 manages rules and the additional content to be provided on the webpage. For simplicity of discussion, the following embodiments are discussed with respect to providing additional content to make the webpages accessible for people with disabilities (e.g., reduced dexterity, sight impaired). However, any type of additional content may be provided in example embodiments. To enable these operations, the publication system 120 comprises a user interface engine 202, a rules engine 204, a rules database 206, and a controller 208, which may be communicatively coupled together.

The user interface engine 202 provides a user interface with which a user may configure the additional content for a webpage. In one embodiment, the user interface engine 202 provides a user interface with an overlay panel over the webpage with which the additional content to be added may be configured. A user may then select one or more fields and/or answer one or more questions regarding requirements or a description that the user wants read out loud by a screen reader for each field. In another embodiment, a sidebar or panel may slide out from a side of the user interface instead of merely providing the overlay. The sidebar may comprise the one or more fields that the user may select from to provide additional content to make the webpage more accessible.

For example, a particular feature or field may have a minimum and maximum number of characters that are required for the field. As such, the user may indicate, for example, that a maximum value of ten and a minimum value of four are required for that particular field (e.g., provide a value requirement). Additionally, the field may be indicated to be, for example, required for security purposes, for example, by selecting a checkbox (e.g., provide a security requirement). This information may be translated into what each of the attributes may look like and gets stored in the rules database 206 as rules and additional content for the field in the webpage. Additionally, the user interface can be configured to provide a series of preset configurations. In this embodiment, it is configured to provide accessibility related fields.

The rules engine 204 works with the user interface engine 202 to create and store the rules in the rules database 206. When the user provides inputs using the user interface regarding the additional content to be added to the webpage and selects a save button, the user interface engine 202 may provide the inputs to the rules engine 204. In turn, the rules engine 204 analyzes the inputs and creates rules based on the inputs. The rules are then stored to the rules database 206 for later retrieval and application to the webpage. The rules generation process will be discussed in more detail in connection with FIG. 5 below.

The controller 208 triggers the provisioning of the additional content into the webpage without the need for revising source code for the webpage. In example embodiments, the controller 208 comprises JavaScript that triggers the provisioning of the additional content into the webpage as soon as the webpage is loaded onto a client device (e.g., client device 110). In these embodiments, the controller 208 can identify the webpage because the JavaScript has access to the URL information. While the controller 208 is shown to be a part of the publication system 120, in an alternative embodiment, the controller 208 may be located at the client device.

In one embodiment, the controller 208 may trigger operations of the rules engine 204, which manages the rules and additional content. In response, the rules engine 204 examines the rules database 206 to locate a rule set for additional content that the user has configured about the corresponding webpage (e.g., additional title, description, images, or content to associate with or replace features or components of the webpage). In one embodiment, the rules engine 204 determines whether there are any rules that match the URL of the webpage. If a matching rule set is found, the rules engine 204 or the controller 208 may load the rule set into memory.

The controller 208 may then inject the rules and/or content into the webpage such that, for example, when a screen reader goes to read the fields of the webpage, the screen reader has access to the additional content. In one embodiment, the injected rules and content may replace a field of the webpage with a new field that includes the additional content. In an alternative embodiment, the injected rules and content may supplement the field of the webpage with the additional content. While the controller 208 and the rules engine 204 are shown to be separate components, in some embodiments, the controller 208 and the rules engine 204 may be combined into the same component.

In one embodiment, the rules database 206 is storage for targeting rules that are used to access fields and attributes which are the additional content added to each field. Further still, the rules database 206 may store the additional content. It is noted that no information regarding the original page, other than a targeting rule, needs to be stored in the rules database 206.

Although the various components of the publication system 120 have been defined in terms of a variety of individual components, modules, and engines, a skilled artisan will recognize that many of the items can be combined or organized in other ways and that not all modules or engines need to be present or implemented in accordance with example embodiments. Furthermore, not all components of the publication system 120 have been included in FIG. 2. In general, components, protocols, structures, and techniques not directly related to functions of exemplary embodiments have not been shown or discussed in detail. The description given herein simply provides a variety of exemplary embodiments to aid the reader in an understanding of the systems and methods used herein.

Figure 3:
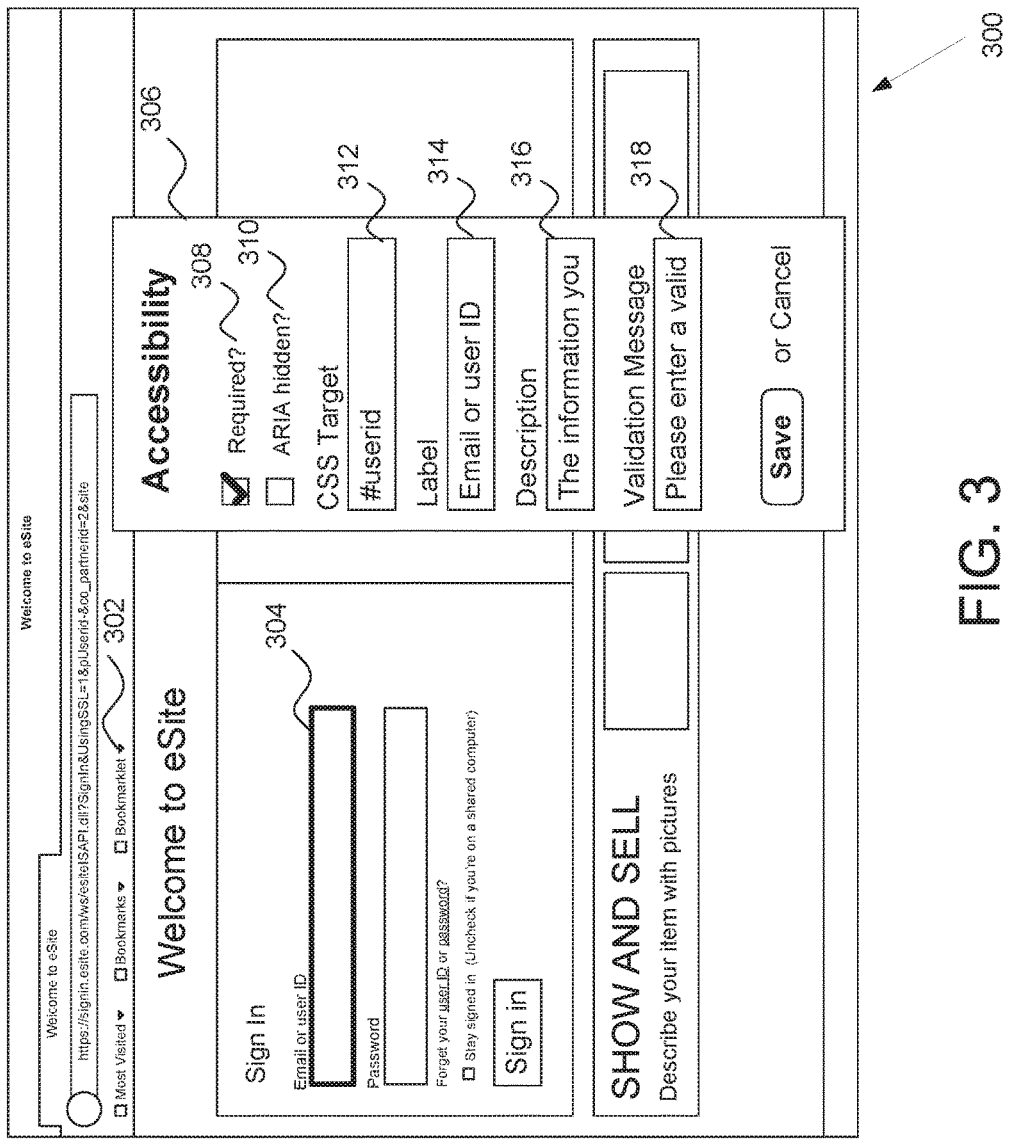
FIG. 3 is an example screenshot of a user interface for creating additional content rules.

FIG. 3 is an example screenshot of a user interface 300 that is used for creating additional content rules for adding content to a webpage without having to revise the source code. The user interface 300 is provided by the user interface module 202. In one embodiment, a rules generation process of the user interface 300 may be activated by the user clicking on a bookmarklet 302 or activating a browser plugin. The activation allows the user to select an element 304 to which the user wants to add accessibility features. The element 304 may be any form element, image, containers, features, and so forth found on the original webpage. When the element 304 is selected on the webpage, the element 304 may be highlighted or otherwise visually distinguished from other elements on the webpage, and field 312 is populated with an element selector that uniquely identifies the form element on the page. In the example of FIG. 3, the selected element 304 is a field where a website user is to enter an email or user identifier to sign into their account.

Once the element 304 is selected, a user interface panel 306 is overlaid or otherwise presented on the user interface 300. The user interface panel 306 comprises a list of options or rules that can be applied to the selected element 304. Accordingly, the user may indicate whether accessibility content for the element 304 is required (by selecting the required checkbox 308) or whether the accessibility content for the element 304 and its descendants are hidden (by selecting the ARIA (Accessible Rich Internet Applications) hidden checkbox 310).

In one embodiment, the "CSS Target" field 312 allows a CSS (Cascading Style Sheets) target value to be entered. The CSS target value is a unique identifier for the element 304 on the webpage that along with the URL of the webpage forms a composite key to store the additional accessibility features in the rules database 206. In the present example, the CSS Target value 312 is "#userid," indicating the form element has an identifier of "userid" in the current system.

A label field 314 allows the user to enter accessibility information indicating a text value of an associated label element 304. In the present example, the associated label element 304 is configured to be "Email or user ID."

A description field 316 allows the user to enter a description for the element 304 which will manifest as an aria-described by attribute and inject the associated description element. The description may then be presented (e.g., by a screen reader) as additional accessibility content describing the element 304. For example, the description may indicate that the information that a website user provides for this field may be changeable at any time.

A validation message field 318 allows the user to enter a message to be read by a screen reader when the element 304 is considered to be in an invalid state. In the present example, the input should be an email address or user identifier. Therefore, a validation message may request the website user to "please enter a valid email address or user identifier" after a form validator (e.g., of the rules engine 204) is executed.

Once the user completes filling one or more of the fields 312-318 and/or selects one or more checkboxes 308-310, the user may save the information entered on the user interface panel 306. Once saved, rules and additional content for the element 304 are generated and stored by the rules engine 204 to the rules database 206.

FIG. 4A is an example screenshot of a webpage 400. In the present example, the webpage 400 is used to create an account with eSite. The webpage 400 provides a plurality of fields in which a website user may provide inputs to create an account. A website user that is visually impaired may have difficulty distinguishing the fields on the website or may desire to obtain additional information for the fields. As such, the website user may trigger a screen reader to provide additional content for one or more fields on the webpage.

Figure 4B:
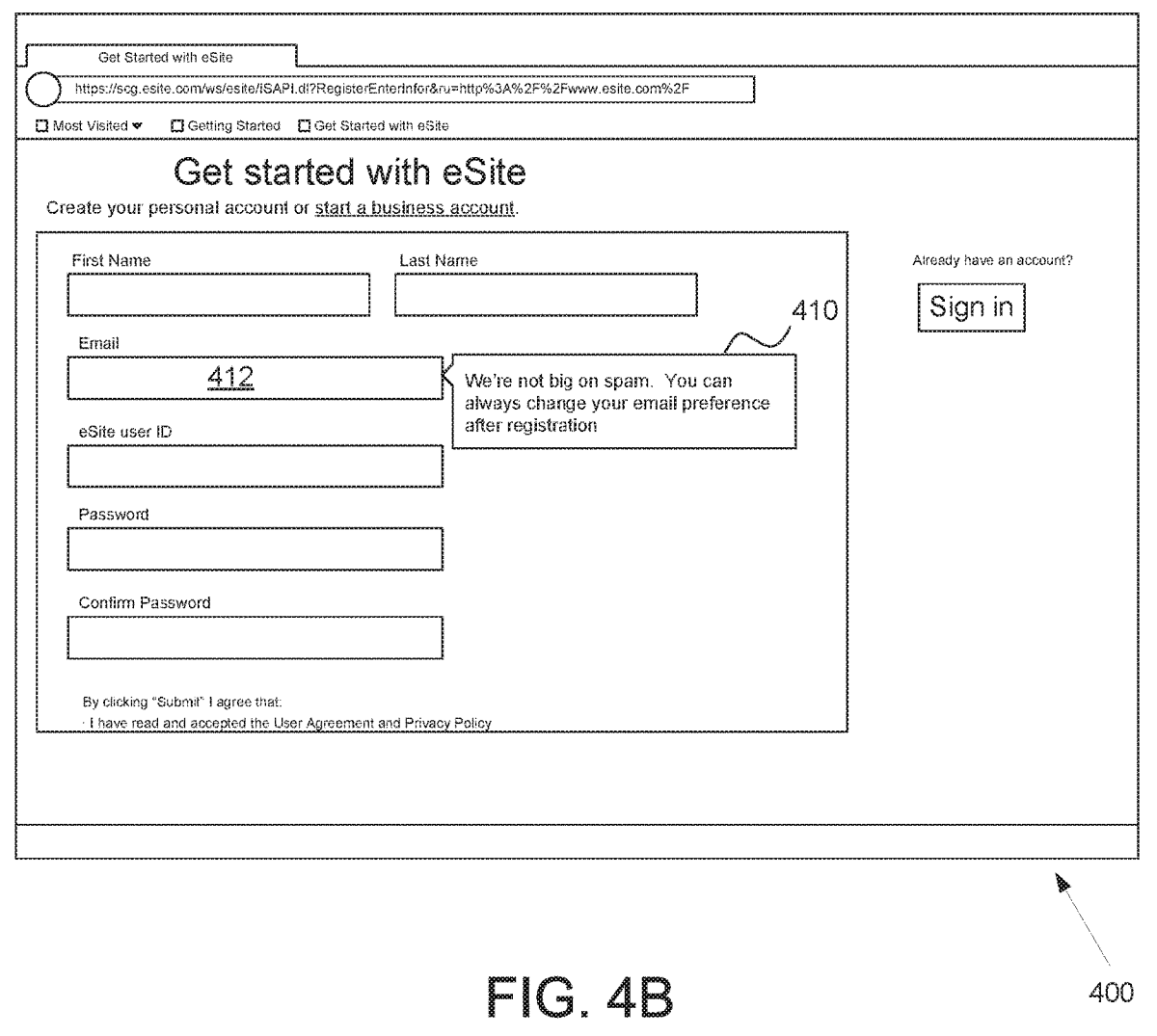

FIG. 4B is an example screenshot of the webpage 400 illustrating provisioning of some additional content on the webpage 400. In example embodiments, the screen reader may provide an audible version of the additional content while a text bubble 410 provides a visual version of the additional content. For example, when the website user positions their cursor on or near an email field 412, the additional content may indicate that the user can always change their email preference after registration.

FIG. 4C is an example screenshot of the webpage 400 illustrating provisioning of another piece of additional content on the webpage 400. In this screenshot, the website user may have positioned their cursor on or near the eSite user ID field 420. As a result, the screen reader and a text bubble 422 may indicate that the website user should use at least six characters for their eSite user identifier and advises the website user to not use their email address or full name as their user identifier.

FIG. 4D is an example screenshot of the webpage 400 illustrating provisioning of yet another piece of additional content on the webpage 400. In this screenshot, the website user may have positioned the cursor on or near a password field 430. This may result in the screen reader and a text bubble 432 indicating that the website user should use a password that includes at least six letters and to include numbers or symbols if the website user wants to make their password more secure. Additionally, the website user is informed to not use their user identifier or email as the password and to avoid passwords that the website user uses on other sites.

The screenshots of FIG. 4A-4D are examples of accessibility content that may be provided on a webpage. It is noted that not all fields on a webpage may have associated accessibility content available for presentation. Additionally, while examples were described whereby accessibility content was provided using example embodiments, it is contemplated that embodiments may be used to provide any type of additional content (or replacement content) on the webpage.

Figure 5:
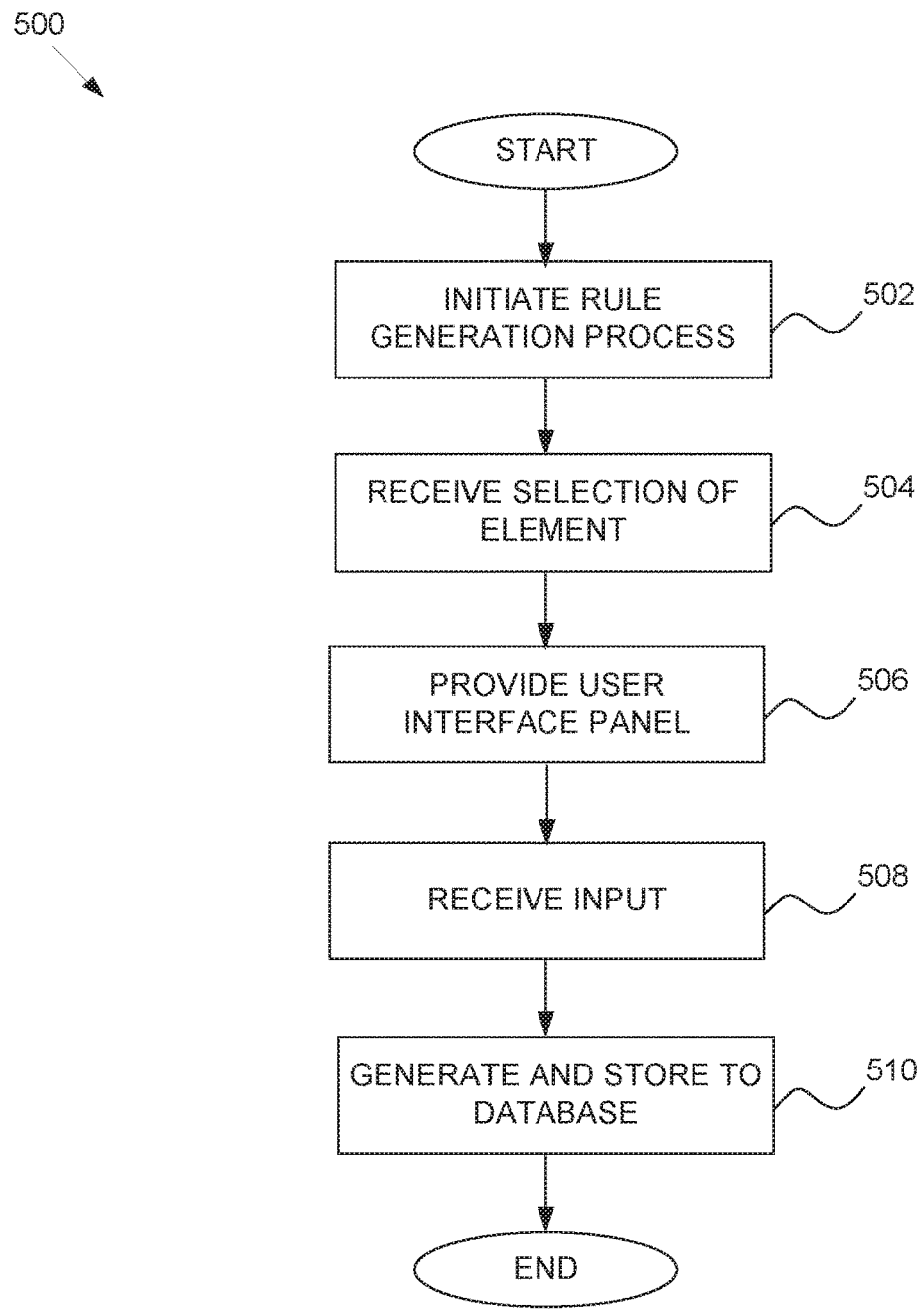
FIG. 5 is a flowchart of an example method for generating additional content rules for a webpage.

Referring now to FIG. 5, a flowchart of an example method 500 for generating content rules and additional content for a webpage is provided. In example embodiments, the content rules are directed to providing accessibility content to visually impaired users. However, alternative embodiments may contemplate providing any type of additional content (or replacement content) to an existing webpage without having to revise the source code for the webpage. For example, additional fields, images, descriptions, text, or other information may be added to the existing webpage simply by creating rules for the inclusion of the additional content and storing the rules and the additional content to the rules database 206, which are later accessed by the controller 208 or triggered to be accessed by the controller 208.

In operation 502, the user initiates the rule generation process. In example embodiments, the user may access the webpage and activate a rule generation trigger. In one embodiment, the rule generation process may be activated by the user clicking on a bookmarklet or activating a browser plugin associated with the webpage.

In operation 504, a selection of an element on the webpage is received. The element that is selected from the webpage is a field or component for which the user wants to provide additional content. For example, in FIG. 3, the user selects the "Email or user ID" field 304.

Once the element is selected, a user interface panel is provided on the webpage in operation 506. In example embodiments, the user interface engine 202 provides the user interface panel overlaid over the webpage in association with the selected element. For example, the selected element may be visually distinguished and the user interface panel may be positioned relatively near the visually distinguished element. The user interface panel provides one or more selection boxes and/or fields where the user may indicate requirements, suggestions, comments, descriptions, labels, titles, or any other additional content for the selected element. As such, the selections and fields on the user interface panel may be unique for each element of a webpage. For example, selections and fields on a user interface panel for an element directed to inputting a user identifier may be different than selections and fields on a user interface panel for an element directed to inputting a password or address. In an alternative embodiment, the element does not need to be preselected in order to trigger presentation of the user interface panel. Instead, the element can be selected after the user interface panel is triggered.

In operation 508, input(s) on the user interface panel are received by the publication system 120. Accordingly, the user may select checkboxes and provide text, descriptions, references to images, or any other content for one or more fields on the user interface panel. The user may then save the input(s), effectively sending the input(s) to the publication system 120.

In operation 510, rules and additional content are generated and stored based on the input(s). In example embodiments, the rules engine 204 generates the rules and additional content and stores the information to the rules database 206. The rules and additional content may be indexed in the rules database 206 and linked to the webpage using at least the URL of the webpage. In some cases, a CSS target value provided by the user in conjunction with the URL may be used to link the rules and additional content to the webpage. Thus, the additional content is stored in a location separate from the source code.

While embodiments are discussed whereby the additional content is created based on user inputs, some embodiments may derive the additional content based on what is already known about the webpage. For example, if standards or guidelines are provided (e.g., Web Content Accessibility Guidelines (WCAG)), these standards or guidelines may be analyzed by the rules engine 204 in view of the webpage to derive the rules and additional content.

Figure 6:
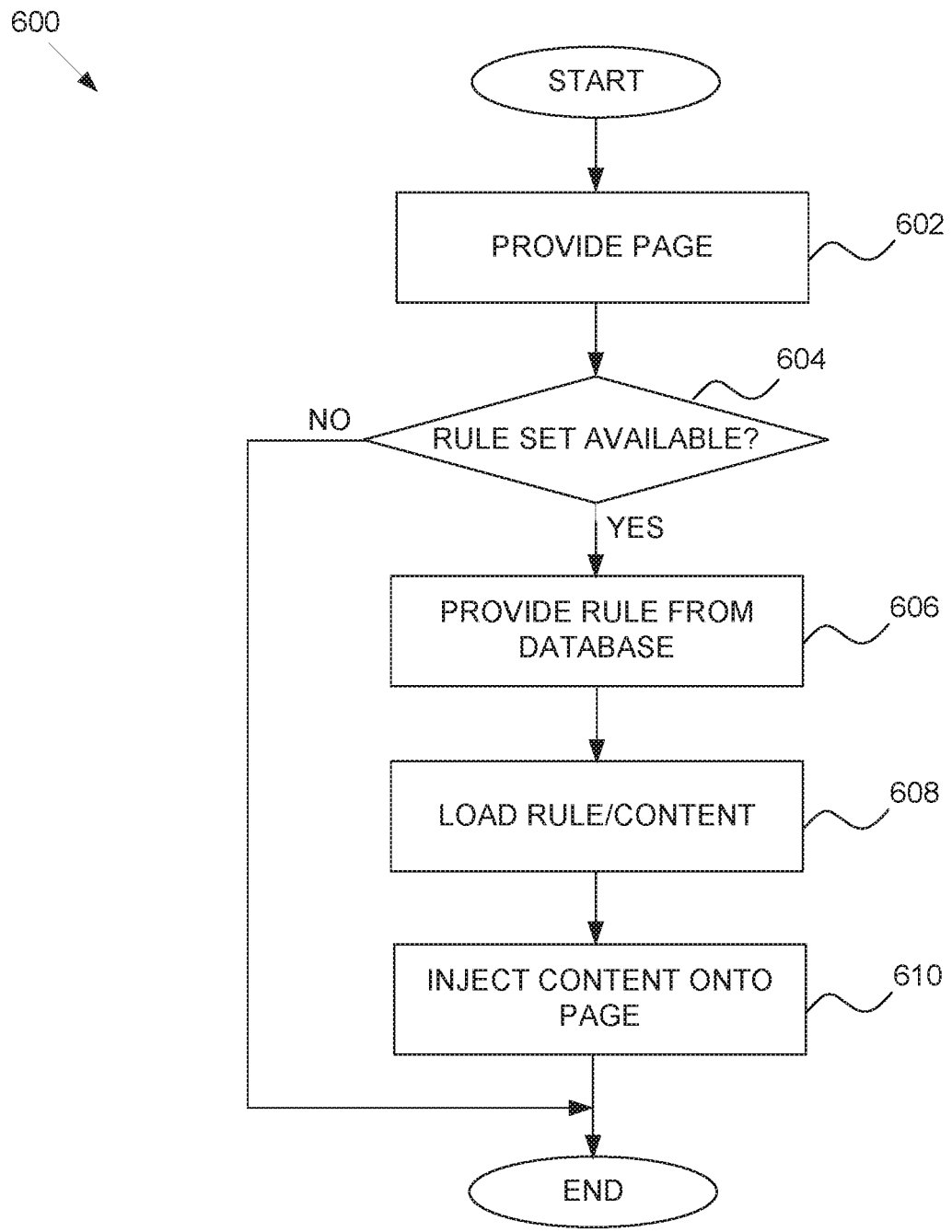
FIG. 6 is a flowchart of an example method for providing additional content on a webpage.

FIG. 6 is a flowchart of an example method 600 for providing additional content on a webpage. In operation 602, a webpage is provided to a client device (e.g., client device 110). In one embodiment, as soon as the webpage is loaded onto the client device, the controller 208 executes to cause provisioning of additional content.

In operation 604, a determination is made as to whether there is a rule set and additional content available for the URL. In one embodiment, a lookup is performed by the rules engine 204 in the rules database 206 to find a matching URL. If a match is not found, then the method 600 ends and no additional content is provided for the webpage. However, if a match is found, then the rule set is accessed and provided in operations 606.

The rule set, which indicates or includes the additional content, may be loaded into memory in operation 608. For example, the rules engine 204 or the controller 208 may load a rule set that is found in the rules database 206 into memory.

The additional content is then injected into the webpage in operation 610. In some embodiments, the additional content may replace one or more elements of the webpage. For example, a password input field may be replaced with a similar (or same) password input field along with audible and visual descriptions of requirements (e.g., the password should be between six to ten characters and include at least one number or symbol). In other embodiments, the additional content supplements the one or more elements of the webpage. For example, the password input field on the webpage may remain unchanged and the additional audible and visual descriptions supplemented on the webpage. In another embodiment, the additional content may cause an element to be hidden or become unavailable on the webpage. When the additional content in the webpage is returned to the client device, the CSS target value may be used to determine to what element(s) to apply the additional content.

Once the additional content is injected into the webpage, a screen reader, for example, can pick up the additional content from the webpage and audibly present the additional content where applicable.

While examples were described herein whereby accessibility content was provided using example embodiments, it is contemplated that embodiments may be used to provide any type of additional content on the webpage. For example, additional text, images, fields, or selections not related to accessibility may be provided on the webpage without having to edit the underlying source code of the webpage. In one instance, example embodiments may provide a content management system where the user may program the rule set to go and change, for example, a product of the day on the website, and this system will inject that new content on the client side. Thus, example embodiments may provide a system for manipulating page data on the webpage.

Figure 7:
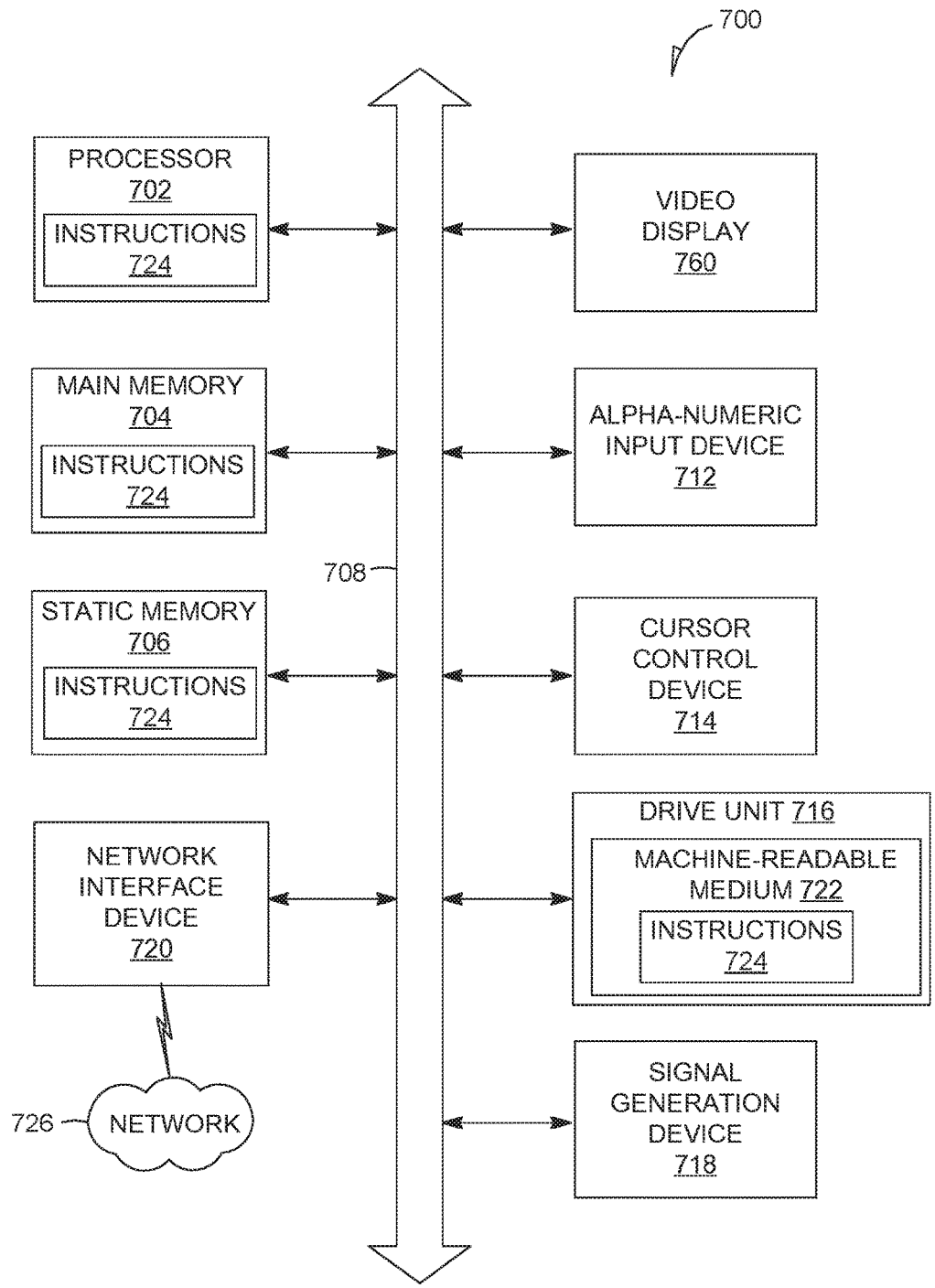
FIG. 7 is a simplified block diagram of a machine in an example form of a computing system within which a set of instructions for causing the machine to perform any one or more of the methodologies discussed herein may be executed.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alpha-numeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a tangible machine-readable medium able to store data temporarily or permanently and may be taken to include, but not be limited to, random-access memory (RAM), read-only memory (ROM), buffer memory, flash memory, and cache memory. While the tangible machine-readable medium 722 is shown in an example embodiment to be a single medium, the term "tangible machine-readable medium" should be taken to include a single medium or multiple media (e.g., a centralized or distributed database, or associated caches and servers) able to store instructions. The term "tangible machine-readable medium" shall also be taken to include any medium, or combination of multiple media, that is capable of storing instructions for execution by a machine (e.g., machine 700), such that the instructions 724, when executed by one or more processors of the machine (e.g., processor 702), cause the machine to perform any one or more of the methodologies described herein. Accordingly, a "tangible machine-readable medium" refers to a single storage apparatus or device, as well as "cloud-based" storage systems or storage networks that include multiple storage apparatus or devices. The term "tangible machine-readable medium" shall accordingly be taken to include, but not be limited to, one or more data repositories in the form of a solid-state memory, an optical medium, a magnetic medium, or any suitable combination thereof. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi, LTE, and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving, by a server, a trigger for a rule generation process;

receiving, by the server, a selection of an element on a webpage to which additional content is to be added without revising source code for the webpage;

causing, by the server, display of a user interface panel over a portion of the webpage, the user interface panel providing one or more selectable options associated with display of the additional content for the selected element and one or more fields for receiving the additional content for the selected element;

receiving, by the server, inputs via the user interface panel, the inputs comprising a selected option from the one or more selectable options and the additional content for the selected element;

in response to the receiving the inputs, generating, using a hardware processor of the server, a rule set that includes a content rule based on the selected option and the additional content to be injected into the webpage without revising the source code;

storing, by the server, the rule set that includes the content rule and the additional content to a rules database;

receiving an indication of the webpage loaded at a client device;

in response to receiving the indication, determining that the rule set in the rules database corresponds to the webpage; and in response to the determining, causing the additional content from the rule set to be injected into the webpage without revising the source code for the webpage.

2. The method of claim 1, wherein the additional content comprises content that replaces or modifies the element on the webpage.

3. The method of claim 1, wherein the additional content comprises content that hides the element on the webpage or causes the element to become unavailable on the webpage.

4. The method of claim 1, wherein:
the additional content comprises audible content, and
a screen reader uses the audible content to provide an audible version of the additional content.

5. The method of claim 1, wherein the additional content comprises visual content that is displayed relative to the element.

6. The method of claim 1, wherein the storing of the rule set comprises:
indexing the content rule and the additional content in the rules database; and
linking the content rule and the additional content to the webpage using at least a URL of the webpage, the URL being an identifier of the webpage.

7. The method of claim 6, further comprising using a CSS target value provided by the user in conjunction with the URL to link the content rule and the additional content to the webpage.

8. The method of claim 1, wherein the rules database is located separate from a location storing the source code.

9. A hardware storage device storing instructions which, when executed by the at least one hardware processor of a machine, cause the machine to perform operations comprising:
receiving a trigger for a rule generation process;
receiving a selection of an element on a webpage to which additional content is to be added without revising source code for the webpage;
causing display of a user interface panel over a portion of the webpage, the user interface panel providing one or more selectable options associated with display of the additional content for the selected element and one or more fields for receiving the additional content for the selected element;

receiving inputs via the user interface panel, the inputs comprising a selected option from the one or more selectable options and the additional content for the selected element;

in response to the receiving the inputs, generating a rule set that includes a content rule based on the selected option and the additional content to be injected into the webpage without revising the source code;

storing the rule set that includes the content rule and the additional content to a rules database;

receiving an indication of the webpage loaded at a client device;

in response to receiving the indication, determining that the rule set in the rules database corresponds to the webpage; and in response to the determining, causing the additional content from the rule set to be injected into the webpage without revising the source code for the webpage.

10. The hardware storage device of claim 9, wherein the additional content comprises content that replaces or modifies the element on the webpage.

11. The hardware storage device of claim 9, wherein the additional content comprises content that hides the element on the webpage or causes the element to become unavailable on the webpage.

12. The hardware storage device of claim 9, wherein:
the additional content comprises audible content, and
a screen reader uses the audible content to provide an audible version of the additional content.

13. The hardware storage device of claim 9, wherein the storing of the rule set comprises:
indexing the content rule and the additional content in the rules database; and
linking the content rule and the additional content to the webpage using at least a URL of the webpage, the URL being an identifier of the webpage.

14. A system comprising:
one or more hardware processors; and
a hardware storage device comprising instructions that when executed by the one or more hardware processors, cause the one or more hardware processors to perform operations comprising:
receiving a trigger for a rule generation process;
receiving a selection of an element on a webpage to which additional content is to be added without revising source code for the webpage;
causing display of a user interface panel over a portion of the webpage, the user interface panel providing one or more selectable options associated with display of the additional content for the selected element and one or more fields for receiving the additional content for the selected element;
receiving the inputs via the user interface panel, the inputs comprising a selected option from the one or more selectable options and the additional content for the selected element;
in response to the receiving the inputs, generating, based on the inputs, a rule set that includes a content rule based on the selected option and the additional content to be injected into the webpage without revising the source code;
storing the rule set that include the content rule and the additional content to a rules database;

receiving an indication of the webpage loaded at a client device;

in response to receiving the indication, determining that the rule set in the rules database corresponds to the webpage; and in response to the determining, causing the additional content from the rule set to be injected into the webpage without revising the source code for the webpage.

15. The system of claim 14, wherein the additional content comprises one or more of:

content that replaces or modifies the element on the webpage;

content that hides the element on the webpage or causes the element to become unavailable on the webpage;

audible content, wherein a screen reader uses the audible content to provide an audible version of the additional content; or visual content that is displayed relative to the element.

16. The system of claim 14, wherein the storing of the rule set comprises:

indexing the content rule and the additional content in the rules database; and linking the content rule and the additional content to the webpage using at least a URL of the webpage, the URL being an identifier of the webpage.

17. The system of claim 14, wherein the rules database is located separate from a location storing the source code.

* * * * *